UNITED STATES PATENT OFFICE.

ALBRECHT SCHMIDT AND GEORGE MERLING, OF BERLIN, GERMANY, ASSIGNORS TO THE CHEMISCHE FABRIK AUF ACTIEN, VORMALS E. SCHERING, OF SAME PLACE.

COMPOUND OF VINYLDIACETON-ALKAMINS AND PROCESS OF MAKING SAME.

SPECIFICATION forming part of Letters Patent No. 657,880, dated September 11, 1900.

Application filed September 26, 1896. Serial No. 607,110. (Specimens.)

*To all whom it may concern:*

Be it known that we, ALBRECHT SCHMIDT and GEORGE MERLING, citizens of the German Empire, have invented certain new and useful Improvements in the Production of a Vinyldiacetonalkamin Melting at 138° Centigrade and Anesthetics Therefrom, (for which British Patent No. 20,697 of 1896 and German Patent No. 95,622 have been obtained;) and we do hereby declare the following to be a full, clear, and exact description of the invention, such as will enable others skilled in the art to which it appertains to make and use the same.

We have discovered that Fischer's vinyldiacetonalkamin produced by the reduction of vinyldiacetonamin, (see *Berichte der Deutschen Chemischen Gesellschaft* XVII, page 1794,) which, according to Fischer, melts at 123° centigrade, does not represent a uniform body, but that a vinyldiacetonalkamin melting at 138° centigrade can be obtained therefrom by means of crystallizing a salt of Fischer's base—for instance, the hydrochloric-acid salt. The said base melting at 138° centigrade is best produced by transforming at ordinary or elevated temperature, or while cooling with ice Fischer's vinyldiacetonalkamin into its hydrochloric-acid salt, well drying the latter, and then extracting with absolute alcohol. By this treatment the hydrochlorate of a vinyldiacetonalkamin melting at 138° centigrade remains behind, while the filtrate contains the hydrochlorate of another vinyldiacetonalkamin melting at from 161° to 162° centigrade. The first base is easily soluble in water and crystallizes from benzene into hard crystals, which shine like glass. Further, we have found that from the vinyldiacetonalkamin melting at 138° centigrade, as well as from its alkyl derivatives, local anæsthetics may be obtained by substituting the hydrogen atom of the hydroxyl with acidyl groups. As such acidyl groups, by the introduction of which compounds of anæsthetic properties are obtained, the benzoyl group, ($C_6H_5.CO-$,) the toluyl group, ($C_6H_4.CH_3.CO-$,) the phenylacetyl group, ($C_6H_5.CH_2.CO-$,) and the cinnamyl group ($C_6H_5.CH=CH.CO-$) may be chosen. The composition of the so-formed acidyl compounds corresponds to the chemical formula

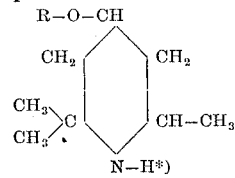

in which formula R is meant for an acidyl group and H*) for a hydrogen atom, which can be replaced by an alkyl group—for instance, by the methyl group ($CH_3$) or the ethyl group ($C_2H_5$).

The bases expressed by the before-mentioned formula, in which the hydrogen atom bound to the nitrogen atom is not replaced by an alcoholic radical, are insoluble in water and decompose upon boiling with watery or alcoholic alkali into the vinyldiacetonalkamin melting at 138° and into the salt of that acid the radical of which has been substituted for the hydrogen atom of the hydroxyl. Thus, for example, the benzoylvinyldiacetonalkamin is split into the base melting at 138° and benzoate of alkali. The bases combine with inorganic and organic acids, thus forming the corresponding salts, which possess strong anæsthetic properties. The hydrochlorates of the said bases are easily soluble in warm water and less soluble in cold.

The properties of the bases expressed by the above formula, in which the hydrogen atom bound to the nitrogen atom is replaced by an alkyl group, correspond with the properties of the aforesaid bases. They are likewise insoluble in water and split, if boiled with alkali, into the alkylvinyldiacetonalkamin and the salt of the respective acid. The salts possess strong anæsthetic properties. The hydrochloric-acid salts are soluble in water.

*Preparation of the acidyl derivatives from the vinyldiacetonalkamin melting at 138° centigrade.*—The benzoyl derivative may, for instance, be obtained in the following manner: Molecular proportions of the dry hydrochloric-acid salt of the base melting at 138° and benzoyl chlorid are heated to 130° centigrade for so long as hydrochloric-acid gas is evolved. The product of the reaction is then dissolved in water and the aqueous solution shaken with ether to remove the excess of benzoyl chlorid. The benzoyl derivative is set free from the hydrochloric-acid solution by means of caustic-soda solution and extracted with ether. After crystallizing out of ligroin the benzoylvinyldiacetonalkamin is obtained in well-formed crystals, which shine like glass and melt at about 78° centigrade. The hydrochloric-acid salt possesses strong anæsthetic properties.

In place of benzoyl chlorid benzoic anhydride may of course be used; also, in place of the hydrochloric-acid salt the free base may be taken, but less advantageously.

The alkyl derivatives from the before-described benzoylvinyldiacetonalkamin are produced by alkylating the latter, for example, with alkyl iodid, or by causing benzoyl chlorid or benzoic anhydride to act upon an alkylvinyldiacetonalkamin.

The alkylvinyldiacetonalkamins are best produced by alkylating the base melting at 138°. The methylvinyldiacetonalkamin is an oil which forms a hydrate melting at about 39° to 40° centigrade. The ethyl derivative from the base melting at 138° is likewise an oil. The benzoylmethylvinyldiacetonalkamin as well as the benzoylethylvinyldiacetonalkamin represent oils. Their hydrochlorates are solid and easily soluble in water.

The preparation of the toluyl, phenylacetyl, and cinnamyl derivatives is similarly brought about. The hydrochloric-acid salts obtained by precipitating the ethereal solution of the said acidyl bases with ethereal hydrochloric acid have all strong anæsthetic properties. After crystallizing out of ligroin the para-toluyl derivative from the vinyldiacetonalkamin melting at 138° is obtained in glassy crystals which melt at about 50° centigrade. The corresponding ortho-toluyl compound melts at about 51° to 52° centigrade.

The phenylacetyl-vinyldiacetonalkamin is an oil. In order to purify it, the raw product is washed with warm water, then taken up with ether to remove small quantities of unchanged vinyldiacetonalkamin, and the ethereal solution dried with potash. By adding ethereal hydrochloric acid the hydrochlorate of the phenylacetyl compound is precipitated as a fine crystalline powder. The cinnamylvinyldiacetonalkamin is an oil. Its hydrochlorate is likewise a crystalline powder. The alkyl derivatives from the before-mentioned acidyl compounds are oily bodies.

The production of the acidyl compounds of the unstable unsymmetrical acetonalkamins forms the subject of an application for patent filed by Carl Harries December 11, 1897, Serial No. 661,514, and our invention does not include the same.

We claim as our invention—

1. As new chemical products, compounds of the herein-described vinyldiacetonalkamin melting at 138°, the composition of which compounds answers the formula

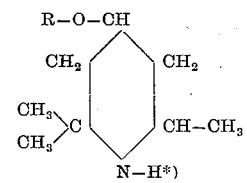

in which R signifies an acidyl group and H*) a hydrogen atom which can be replaced by an alkyl group; such compounds in the form of the free bases are insoluble in water, decompose, upon boiling with watery or alcoholic alkalies, into the corresponding alkamin base and a salt of that acid the radical of which was substituted for the hydrogen atom of the hydroxyl, and combine with inorganic and organic acids to form the corresponding salts which have anæsthetic properties.

2. The process of obtaining local anæsthetics which consists in reducing vinyldiacetonamin to vinyldiacetonalkamin, transforming the latter into a salt, crystallizing this salt, whereby a vinyldiacetonalkamin of a melting-point of 138° centigrade is isolated and substituting in this base an acidyl group for the hydrogen atom of the hydroxyl, substantially as described.

3. As an improvement in the process of obtaining local anæsthetics from the herein-described vinyldiacetonalkamin melting at 138° centigrade, substituting in this base an acidyl group for the hydrogen atom of the hydroxyl, substantially as described.

4. In the process of obtaining local anæsthetics from the herein-described vinyldiacetonalkamin melting at 138° centigrade, the production of alkyl derivatives from the base melting at 138° by treating it with alkyl reagents.

5. In the process of obtaining local anæsthetics from the herein-descrbed vinyldiacetonalkamin melting at 138° centigrade, the production of alkyl derivatives by first producing the acidyl compounds of this base and then treating the acidyl compounds with alkyl reagents.

In testimony whereof we have hereunto set our hands this 14th day of September, 1896.

ALBRECHT SCHMIDT.
GEORGE MERLING.

Witnesses:
W. HAUPT,
HENRY HASPER.